(12) United States Patent
King

(10) Patent No.: US 6,325,430 B1
(45) Date of Patent: Dec. 4, 2001

(54) LAMINATED TRUCK BUMPER

(76) Inventor: Joseph Arthur King, 8925 State Rd. 43 N, Battleground, IN (US) 47920

(*) Notice: Subject to any disclaimer, the term of this patent is extended or adjusted under 35 U.S.C. 154(b) by 569 days.

(21) Appl. No.: 08/697,034

(22) Filed: Aug. 19, 1996

(51) Int. Cl.[7] ............................................ B60R 19/02
(52) U.S. Cl. ................................ 293/102; 293/120
(58) Field of Search .......................... 293/102, 112, 293/120, 121, 122, 142, 152; 362/82; D12/163, 167, 169; 29/897.2, 897.3

(56) References Cited

U.S. PATENT DOCUMENTS

| | | | |
|---|---|---|---|
| 3,590,768 | * | 7/1971 | Shanok et al. ..................... 116/28 |
| 4,225,167 | * | 9/1980 | Buettner et al. ................... 293/120 |
| 4,305,981 | * | 12/1981 | Muroi et al. ....................... 428/31 |
| 4,328,986 | * | 5/1982 | Weller et al. ...................... 293/120 |
| 4,339,144 | * | 7/1982 | Nagasaka .......................... 293/120 |
| 4,466,646 | * | 8/1984 | Delmastro et al. ................ 293/117 |
| 4,569,865 | * | 2/1986 | Placek ............................... 428/31 |
| 5,067,759 | * | 11/1991 | Fleming ............................. 293/109 |
| 5,131,702 | * | 7/1992 | Matthysse et al. ................ 293/121 |

FOREIGN PATENT DOCUMENTS 55-110639 * 8/1980 (JP) ..................................... 293/121

OTHER PUBLICATIONS

JC Whitney Catalog, Jan. 16, 1996 edition, p. 126.*

* cited by examiner

Primary Examiner—Stephen T. Gordon
Assistant Examiner—Jason Morrow
(74) Attorney, Agent, or Firm—Varnum, Riddering, Schmidt & Howlett LLP

(57) ABSTRACT

A laminated, truck bumper (10) having an exterior surface (14) with a prescribed mechanical finish (15) such as a highly reflective (mirror) finish that is uniform in appearance and does not have any fasteners or undesirable apertures extending therethrough. The laminated bumper includes an outer sheet (11) and a reinforcing sheet (16) that is configured with a generally U-shaped channel (17) and disposed in the channel recess (13) of the similarly configured channel (12) of the outer sheet. The reinforcing sheet is welded to the outer sheet and has indentations (19) therein each with an aperture (20) for extending a fastener (21) therethrough. The head (22) of each fastener is fixedly secured entirely in the reinforcing sheet indentation so as not to disrupt or interfere with the uniform appearance of the highly reflective finish of the outer sheet.

20 Claims, 3 Drawing Sheets

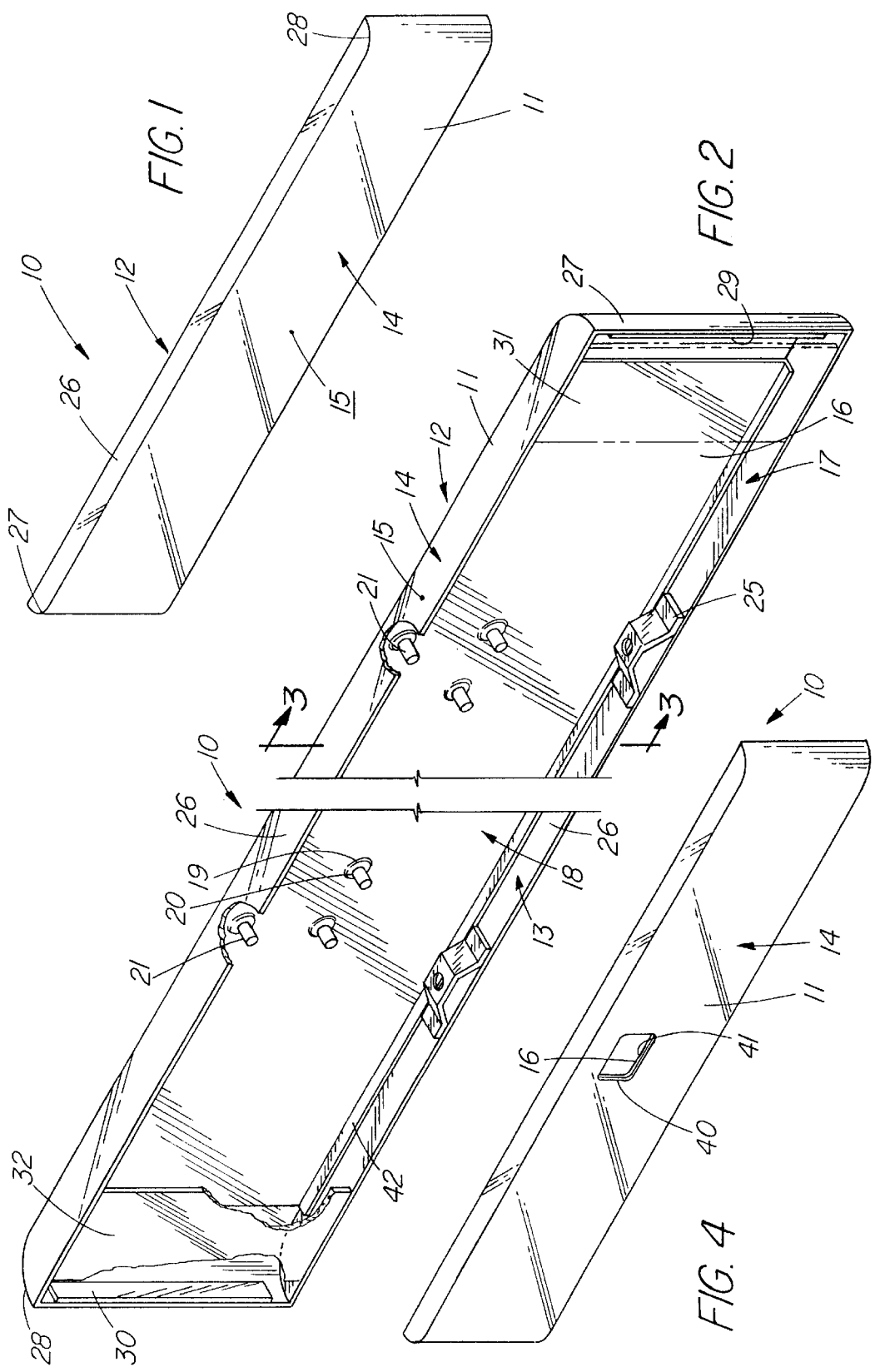

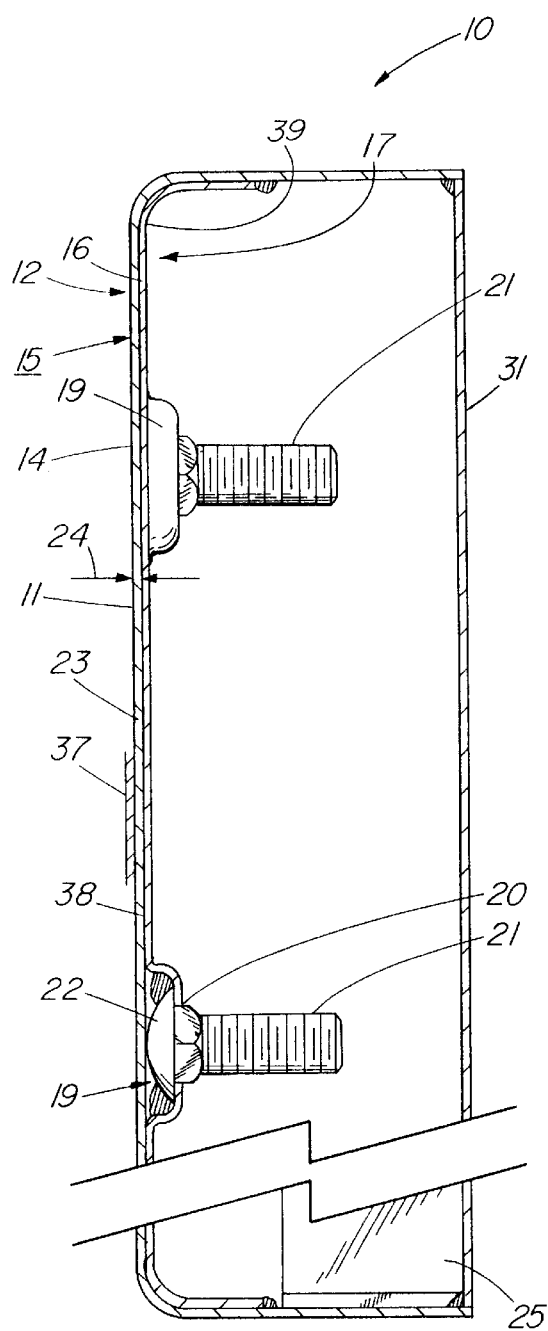
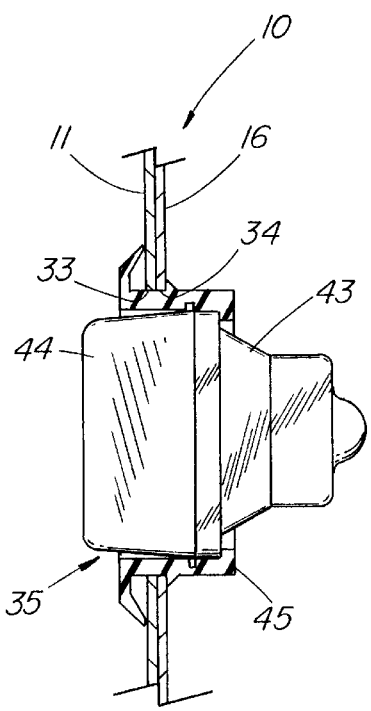
FIG. 3
FIG. 6

LAMINATED TRUCK BUMPER

TECHNICAL FIELD

This invention relates generally to motor vehicle truck parts and particularly to a back bumper.

BACKGROUND

Chrome-plated steel and aluminum bumpers have been available for heavy weight trucks for a number of years to enhance the appearance of the truck. However, as soon as a fastener is inserted through the chrome-plated steel or aluminum bumper and tightened to secure the bumper to the truck body, the brittle, thin chrome plating is fractured, and the corrosion process immediately starts. It is then simply a matter of time before the corrosion appears, thus ruining the visual appearance and effect of the shiny chrome. As the corrosion process continues, the chrome plating separates from the base metal, further distracting from the appearance of the bumper. Further corrosion also affects the structural integrity of the bumper. Eventually, the truck owner replaces the unsightly and structurally weakened bumper, and the corrosion process repeats itself as soon as the fasteners are tightened.

One attempt to solve the problem has been to weld threaded studs to the back surface of the bumper. These welded studs replace the use of fasteners that are inserted through the bumper to secure it to the truck body. These threaded studs are typically spot welded to the bumper, which provides minimal attachment force. Spot welds easily fracture when the bumper and, particularly a heavy weight truck bumper, is subjected to an impact or the constant vibration of the truck. A larger surface weld or fillet can be applied to the rear surface of the bumper and the threaded stud with the result that the structural integrity of the stud is weakened due to the heat. Furthermore, this larger weld also heats a larger area of the chrome-plated bumper and for a longer period of time. This can result in the chrome-plating being compromised in the heated area. Separation of the chrome plating from the base metal occurs, and the corrosion process is again enhanced.

Fasteners or apertures placed through any bumper visually distract from the uniform shiny appearance of the exterior bumper surface. The fasteners or aperture edges also reflect light at different angles than the bumper surface, thereby creating a safety concern for oncoming traffic.

A chrome-plated plastic layer has also been utilized, but even the most minor impact fractures the brittle chrome plating as well as the plastic layer.

Stainless steel has been utilized for truck bumpers, but any thickness sufficient for structural integrity is limited to a dull or not very bright surface. Furthermore, any fasteners placed through the stainless steel plate also distract from the visual appearance thereof Stainless steel has also been utilized for other truck parts such as fenders, which have been chrome-plated. However, the stainless steel utilized in these chrome-plated parts is 430 series stainless steel, which is high in chromium and susceptible to oxidation. As a result, as soon as the chrome plating is fractured or compromised, the base stainless steel metal oxidizes with the corrosion appearing through the fracture or compromised area.

SUMMARY OF THE INVENTION

The foregoing problems are solved and a technical advance is achieved in an illustrative truck bumper utilizing a laminated construction and having an outer sheet with an exterior surface having a prescribed mechanical finish such as preferably a bright or highly reflective finish for significantly enhancing the appearance thereof. The laminated construction of the bumper also includes a reinforcing sheet that is configured into a generally U-shaped channel and disposed in the channel recess of the similarly configured channel of the outer sheet. The exterior surface of the outer sheet can advantageously be free of apertures or fastener components, which distract from the uniform visual appearance of the outer sheet and can reflect light in an undesired and unsafe manner to oncoming vehicles. This laminated construction also permits the use of highly reflective or mirror-like finishes that are only commercially and economically available with thinner gauge materials such as stainless steel. The uniform appearance of a highly reflective finish on the outer sheet is advantageously obtained by the use of indentations or projections formed in the reinforcing sheet in which a fastener is positioned therein and extends therefrom into the channel recesses of the outer and reinforcing sheets. The head of the fastener is also fixedly secured to the reinforcing sheet in the indentation and minimizes, if not eliminates, breakage therefrom as with threaded studs that are merely spot welded thereto or severely weakened when welded thereto. The laminated construction thus provides a lightweight bumper that is physically sound and has an exterior surface exhibiting the desired mechanical finish. This laminated construction also permits the use of materials that are resistant to corrosion and preserve the highly desired mechanical finish for extended periods of time.

In one aspect, the mechanical finish is a bright or bright annealed finish such as an AISI, No. 2B, 2BA, 4, 7, or 8 finish. In the preferred embodiment, the outer sheet comprises stainless steel, and the mechanical finish is a reflective finish such as an American Iron and Steel Institute (AISI), No. 2B, 2BA, 3, 4, 7, or 8 finish. The laminated construction of the truck bumper facilitates the use of limited thickness material such as 14 gauge stainless steel with a highly reflective or mirror-like finish such as the No. 7 or 8 American Iron and Steel Institute (AISI) mechanical finish. The finish can be further protected with a transparent coating of, for example, polyvinylchloride. As a result, stainless steel having a thickness of no more than 14 gauge or 0.075 inches with a reflective or highly reflective finish is advantageously available for use in the laminated, truck bumper.

As previously suggested, the fastener of this laminated truck bumper includes a head that is disposed in a reinforcing sheet indentation below the exterior surface surrounding the indentation. This also permits fixedly positioning the head such as welding the fastener head in the indentation. To further secure the bumper to the truck without breaking the integrity of the exterior outer sheet surface, a standoff is disposed on a leg of the generally U-shaped outer sheet channel.

The integrity of the exterior surface of the outer sheet is further maintained with closed ends. Stiffening members are disposed in the channel recesses to reinforce the closed ends. Scuff plates are also disposed across the recessed channels near the closed ends and directly in front of the truck tires to minimize the possibility of cutting or rupturing the tire when impacting the bumper.

To facilitate securing a tow cable to the truck, concentric apertures are formed in the outer and reinforcing sheets to allow placement of the cable therethrough. Concentric apertures can also be utilized for placement of a light fixture therein. A plurality of concentric fastener apertures can also be formed in the sheets should such be desired.

In another aspect, the laminated bumper with a highly reflective finish can be constructed with a plurality of concentric apertures extending therethrough. A light fixture can advantageously be positioned in selected concentric apertures. The outer sheet is thus formed from stainless steel having a 14 gauge maximum thickness and an exterior surface with a highly reflective or bright annealed finish.

In still another aspect of the invention, series 304 stainless steel is utilized because of its high nickel content, which distinguishes it from high chromium, series 430 stainless steel. The high nickel content, series 304 stainless steel is very resistant to oxidation and is essentially corrosion free. As a result, series 304 stainless steel has particular application in medical devices and, more particularly, implantable medical devices. A highly reflective finished piece of series 304 stainless steel can be chrome-plated to take on the appearance of the highly reflective finish underneath. Advantageously, should the chrome plating fracture, the underlying base metal is oxidation and corrosion free. Corrosion simply does not form under the brittle chrome plating that has been fractured. Consequently, the highly reflective finish on the truck bumper is maintained. Furthermore, the chrome plating adds a bright white color to the finish, greatly adding to its brilliant appearance, which distinguishes it from the yellowish color of the underlying series 304 stainless steel base metal.

BRIEF DESCRIPTION OF THE DRAWING

FIG. 1 depicts a front, pictorial view of a laminated, truck bumper of the present invention;

FIG. 2 depicts an enlarged, partially sectioned, rear pictorial view of the laminated, truck bumper of FIG. 1;

FIG. 3 depicts an enlarged, partially sectioned, cross-sectional view of the laminated, truck bumper of FIG. 2 taken along the line 3—3;

FIG. 4 depicts another embodiment of the laminated, truck bumper of FIG. 1 with concentric rectangular apertures extending therethrough;

FIG. 6 depicts an enlarged, partially sectioned, cross-sectional view of the laminated, truck bumper of FIG. 5 with a light fixture positioned in a set of concentric oval apertures of the bumper;

DETAILED DESCRIPTION

Figure 5:
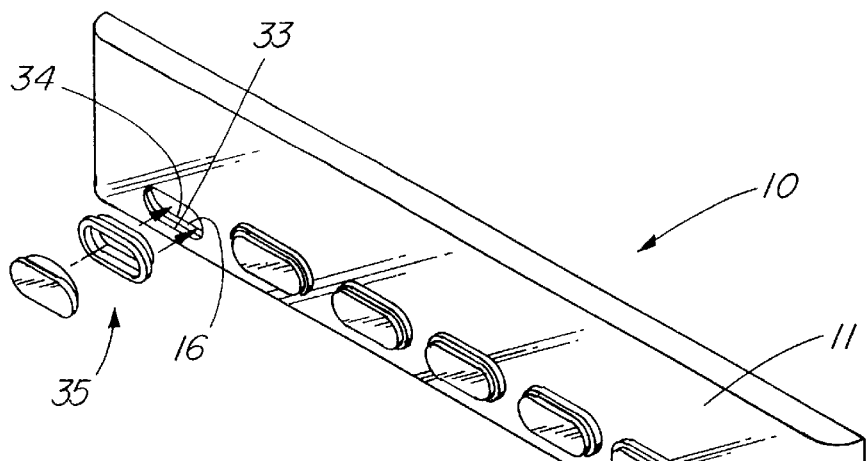
FIG. 5 depicts still another embodiment of the laminated, truck bumper of FIG. 1 with a plurality of concentric oval apertures extending therethrough for positioning light fixtures therein.

FIG. 1 depicts a front, pictorial view of a preferred illustrative embodiment of laminated, truck bumper 10 with exterior surface 14 thereof having a bright, reflective, mechanical finish 15. The bumper includes outer sheet 11 of a material such as series 304 stainless steel that has been configured (cut, bent and welded) into a generally U-shaped elongated channel 12 with side legs 26 and rounded closed ends 27 and 28. Square closed ends are also contemplated.

FIG. 2 depicts an enlarged, partially sectioned, rear, pictorial view of bumper 10 of FIG. 1. Laminated, truck bumper 10 also includes reinforcing sheet 16. Similar to outer sheet 11, the reinforcing sheet is also of a material such as stainless steel that has been configured (cut and bent) into a generally U-shaped, elongated channel 17 with longitudinal channel recess 18 with side legs 42, and open ends. The reinforcing sheet is disposed in longitudinal channel recess 13 of outer sheet channel 12 and connected to outer sheet 11 by, for example, welding side legs 26 and 42 together.

One aspect of this bumper is that exterior surface 14 of outer sheet 11 has a bright, reflective, mechanical finish 15 such as a No. 7 or, preferably, a No. 8, American Iron and Steel Institute (AISI) highly reflective, stainless steel mechanical finish. These highly reflective mechanical finishes are also known as mirror finishes and are desirable for visual and cosmetic effects. Series 304 stainless steel is also preferred for its corrosion resistance. However, the maximum thickness of commercially available stainless steel sheet with these highly reflective mechanical finishes is economically limited to 14 gauge. Only less reflective mechanical finishes are generally available on stainless steel sheets thicker than 14 gauge. As a result, outer sheet 11 and channel 12 is preferably formed from a blank 24" by 96" sheet of 14 gauge, series 304 stainless steel with a No. 2BA (bright annealed) finish that has been buffed to a No. 8 mirror finish. To reduce material costs and maintain corrosion resistance, reinforcing sheet channel 17 is formed from a blank 19.75" by 85.75" sheet of 14 gauge, series 304 stainless steel with a No. 2B (bright cold rolled) finish. Accordingly, this laminated bumper has the necessary physical strength and the preferred, highly reflective (mirror) finish. Furthermore, the remaining sheet stock pieces of the bumper are formed from the lower cost No. 2B finish stainless steel, thereby significantly reducing the overall cost of the bumper.

Another aspect of bumper 10 as depicted in FIG. 1 is that exterior sheet surface 14 is uniform and free of any fastener components thereon or any apertures or holes therein. This aspect of the bumper presents a simple and uniform visual appearance that is free from commonly incurred fasteners and undesired apertures or holes. This also provides a uniform reflective surface and eliminates stray and hazardous reflections from fasteners and aperture edges. Furthermore, this uniform exterior surface further inhibits corrosion formation, which weakens the structural integrity of the bumper and distracts from its visual appearance. To further enhance the bright white color of the finish, exterior surface 14 can be electroplated with a layer of chrome.

FIG. 2 also depicts bumper 10 as including one or more fasteners 21 such as commercially available ½" by 2½" carriage bolts extending through reinforcing sheet 16 and into outer and reinforcing channel recesses 13 and 18. Each of fasteners 21 only extends through reinforcing sheet 16 via an indentation or projection 19 and aperture 20 therein that are used to secure the bumper to one or more structural members of a heavy weight truck such as a semi-tractor trailer highway vehicle. Generally one or more U-shaped standoffs 25 are also disposed in the channel recesses and connected to the bumper by welding them to, for example, side leg 26. These standoffs are commonly used to further secure the bumper to the truck. Fasteners 21 and standoffs 25 are connected to bumper 10 in this manner so as not to interfere with, disturb, or disrupt exterior surface 14 and, more importantly, bright, reflective mechanical finish, 15.

Bumper 10 also includes scuff plates 31 and 32 disposed across channel recesses 13 and 18 near rounded closed ends 27 and 28 of outer sheet channel 12, respectively. The scuff plates are formed from, for example, approximately 17$^{15}/_{16}$" high by 8" wide sheets of No. 2B, 14 gauge, series 304 stainless steel and welded to side legs 26 of the bumper at a position directly in front of the truck's front wheels when the bumper is secured to the truck. The scuff plates lessen the opportunity of the bumper to cut or damage the truck's tires when the bumper is impacted in a collision. To further lessen damage to the truck's tires and to strengthen the bumper ends, stiffening members 29 and 30 of, for example, 1" wide by 17½" long pieces of No. 2B, 14 gauge, series 304 stainless steel is tack welded to rounded closed ends 27 and 28 in the channel recesses, respectively.

FIG. 3 depicts an enlarged, partially sectioned, cross-sectional view of bumper 10 of FIG. 2 taken along the line 3—3. Each of fasteners 21 extends through reinforcing sheet 16 at indentation or projection 19 and aperture 20 formed therein. Head 22 of each fastener is recessed into indentation 19 below external surface 38 surrounding the indentation. The head is secured in the indentation by, for example, welding the head thereto. Aperture 20 is, for example, a square hole to mate with the square shoulder portion of the fastener. This further secures the fastener in a fixed position with respect to outer sheet 11 and also minimizes any structural weakening of the fastener or weld, which is a common problem with tack welding a uniform diameter threaded stud to a flat surface. This fastener arrangement also eliminates any distortion or interruption in exterior surface 14 of outer sheet 11.

The laminated structure of the bumper facilitates the use of highly reflective finish 15 for exterior sheet surface 14. Highly reflective (mirror) finishes are limited by thickness 24 of outer sheet 11, which is presently a 14 gauge maximum thickness. To further protect and enhance highly reflective finish 15, a transparent coating 37 of, for example, a polyvinyl chloride material is applied to the exterior surface of outer sheet 11. The outer surface can also be chrome-plated to further enhance the color and brilliance of the surface. The preferred material for the outer and reinforcing sheets, scuff plates 31 and 32, and stiffening member 29 and 30, is series 304 stainless steel 23. However, metal 39 is a lower cost stainless steel such as No. 2B stainless steel to reduce the overall cost of the bumper.

FIG. 4 depicts another embodiment of truck bumper 10 of FIG. 1 with concentric apertures such as rectangular apertures 40 and 41 extending through outer sheet 11 and reinforcing sheet 16, respectively. These concentric rectangular apertures are formed in the bumper and positioned directly in front of a tow hook that is commonly provided on many semi-tractor/trailer trucks. This configuration does interrupt the uniform appearance of exterior sheet surface 14; however, the head of carriage bolt fasteners are not present to create undesirable reflections and to foster corrosion.

FIG. 5 depicts still another embodiment of laminated, truck bumper 10 of FIG. 1 with a plurality of concentric apertures such as oval or rounded apertures 33 and 34, each extending through outer sheet 11 and reinforcing sheet 16, respectively. This plurality of concentric oval apertures are formed in the bumper so as to place a light fixture 35 in a set of concentric apertures. Light fixtures 35 improve night and fog driving conditions and are also used to enhance the cosmetic appearance of the bumper when so desired. The concentric oval apertures and light fixtures can be positioned in and on the bumper as desired.

FIG. 6 depicts an enlarged, partially sectioned, cross-sectional view of bumper 10 of FIG. 5 with a light fixture 35 positioned in concentric oval apertures 33 and 34 in outer and reinforcing sheets 11 and 16, respectively. Light fixture 35 is commercially available and includes fixture housing 43 and lens 44 positioned in the concentric apertures with, for example, rubber grommet 45.

Figure 7:
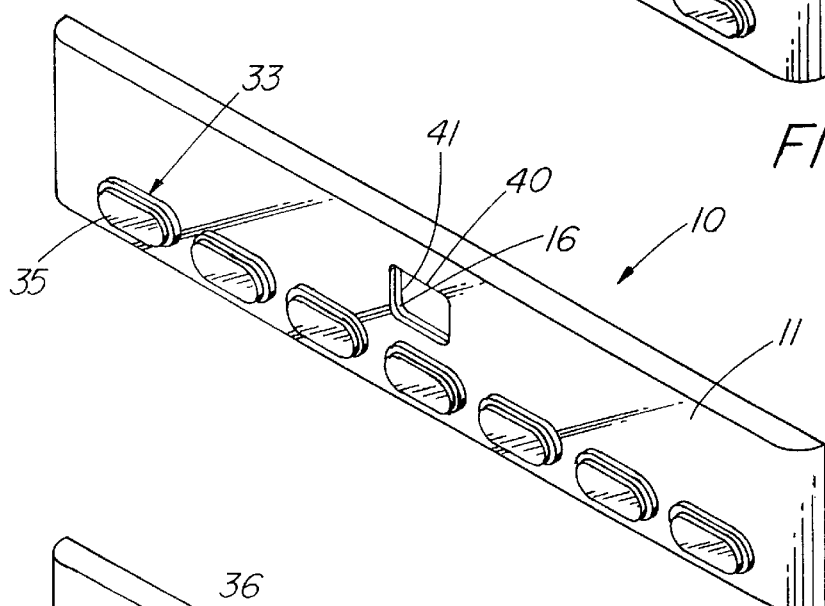
FIG. 7 depicts yet another embodiment of the laminated, truck bumper of FIG. 1 with a plurality of variously shaped concentric apertures extending therethrough.

FIG. 7 depicts yet another embodiment of laminated truck bumper 10 of FIG. 1 with a plurality of concentric apertures 33 and 34 and concentric rectangular apertures 40 and 41 in outer and reinforcing sheets 11 and 16. One set of apertures 40 and 41 is rectangular in nature and positioned in the bumper for inserting a cable therethrough and attachment to a tow hook of the truck. The other sets of apertures 33 and 34 are formed in the laminated bumper for positioning light fixture 35 of desired shapes therein.

Figure 8:
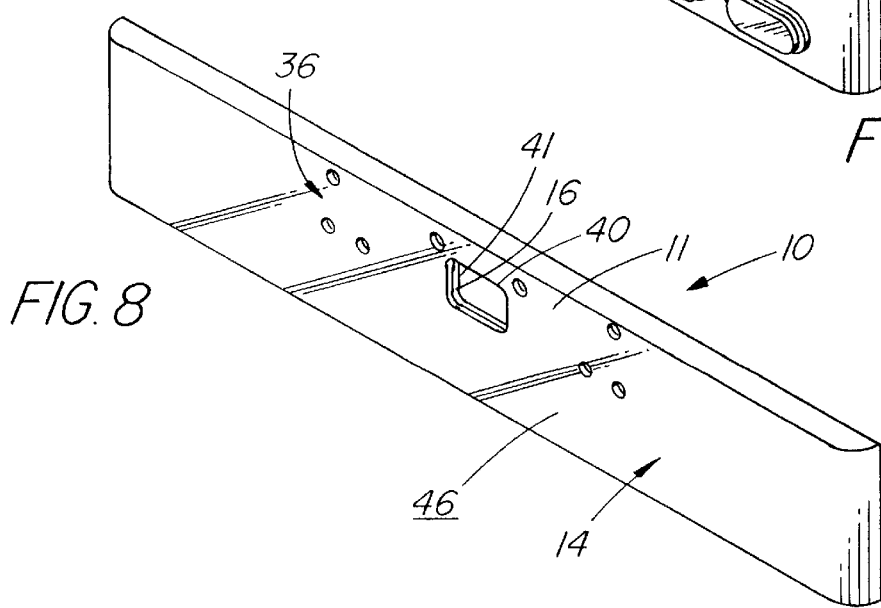
FIG. 8 depicts still yet another embodiment of the laminated, truck bumper of FIG. 1 with variously shaped concentric apertures and concentric fastener apertures.

FIG. 8 depicts still yet another embodiment of laminated, truck bumper 10 of FIG. 1 with concentric rectangular apertures 40 and 41 and concentric fastener apertures 36 extending through outer and reinforcing sheets 11 and 16, respectively. This embodiment of the bumper utilizes a series of fastener apertures 36 extending through the laminated sheets of the bumper in place of or in supplement to the previously described fasteners. This embodiment of the laminated truck bumper does include an outer sheet 11 with an exterior surface 14 having a highly reflective mechanical finish such as No. 7 or No. 8 mirror finish on, for example, series 304 stainless steel with a layer 46 of chrome commercially electroplated thereon.

The mechanical finishes described herein are based on American Iron and Steel Institute, Washington, D.C. (AISI) standard finishes for stainless steel. As defined, mechanical finishes are produced by various mechanical processes such as hot or cold rolling. Mirror-bright finishes are commonly produced by cold rolling on polished rolls or by successive well-known polishing and buffing operations. Rolled mill finishes result from the initial forming of a metal, usually by a rolling process and range in appearance from rough dull to mirror-bright. Cold rolled finishes, which are bright in appearance, include No. 2 strip finish. These bright finishes are obtained by passage through highly polished rolls. A No. 2BA finish is a bright annealed finish and is a highly reflective finish obtained by final annealing in a controlled atmosphere furnace. Final buffing is often employed with the No. 2BA finish. Polished mill finishes are produced by successive steps of grinding, polishing, and also buffing. The simpler polished finishes are the No. 3 and 4 sheet finishes and have the unique property of reflecting any light source in a straight line. Thus, the No. 3 and 4 finishes are considered herein as reflective mechanical finishes. The No. 4 polished finish is also considered a general purpose bright polished finish. The No. 7 and No. 8 polished finishes of stainless steel are highly reflective mechanical finishes, the No. 8 being the most reflective finish commonly produced. The No. 7 and No. 8 are also considered herein as mirror finishes which are both bright and reflective. The No. 8 finish utilizes a buffing operation with a very fine buffing compound. Chrome plating is applied on the No. 8 finish of series 304 stainless steel to prevent corrosion from propagating therethrough.

It is to be understood that the above-described laminated truck bumper is merely an illustrative embodiment of the principle of this invention and that other embodiments of the laminated truck bumper may be devised by those skilled in the art without departing from the spirit and scope of the invention. In particular, it is contemplated that other materials or metals other than stainless steel can be utilized in the laminated structure. Plastic, fiberglass, carbon fiber, or polymer materials are contemplated as substitute or supplemental materials for the outer and reinforcing sheets. Highly reflective coatings on base materials are also contemplated, but these coatings should be corrosion resistant and not fractured when subjected to fastener tightening.

What is claimed is:

1. A laminated, truck bumper (10) comprising:
    an outer sheet (11) configured into a first elongated channel (12) having a first recess channel (13) extending longitudinally therein, an exterior surface (14) of said outer sheet having a mechanical finish (15);
    a reinforcing sheet (16) configured into a second elongated channel (17) having a second channel recess (18) extending longitudinally therein, said reinforcing sheet being disposed in said first channel recess of said outer sheet and connected thereto, an exterior surface (38) of said reinforcing sheet having an indentation (19) therein extending into said second channel recess, said indentation having an aperture (20) extending therethrough;
    a fastener (21) extending through said aperture and into said second channel recess.

2. The laminated, truck bumper of claim 1 wherein said mechanical finish is a bright finish.

3. The laminated, truck bumper of claim 1 wherein said outer sheet comprises series 304 stainless steel (23) and wherein said mechanical finish is a reflective finish.

4. The laminated, truck bumper of claim 1 wherein said outer sheet comprises stainless steel (23) and having a sheet thickness (24) of substantially no more than 0.075 inches, and wherein said mechanical finish is a reflective finish.

5. The laminated, truck bumper of claim 1 wherein said fastener includes a head (22) disposed in said apertured indentation below said exterior surface of said reinforcing sheet surrounding said apertured indentation.

6. The laminated, truck bumper of claim 5 wherein said fastener is connected to said reinforcing sheet.

7. The laminated, truck bumper of claim 1 further comprising a standoff (25) disposed on a leg (26) of at least one of said outer sheet and said reinforcing sheet.

8. The laminated, truck bumper of claim 1 wherein said first elongated channel of said outer sheet includes first and second closed ends (27, 28).

9. The laminated, truck bumper of claim 8 further comprising first and second stiffening members (29, 30) disposed in said first recess of said first channel and on said first and second closed ends, respectively.

10. The laminated, truck bumper of claim 1 wherein said first elongated channel (12) comprises side legs (26), the bumper further comprising first and second scuff plates (31,32) disposed across said first channel of said outer sheet extending between said side legs near a first and a second end (27,28) of said first channel, respectively.

11. The laminated, truck bumper of claim 1 wherein said outer and said reinforcing sheets have first and second concentric apertures (33,34; 40,41) extending therethrough.

12. The laminated, truck bumper of claim 1 further comprising a layer (46) of chrome disposed on said exterior surface of said outer sheet.

13. The laminated, truck bumper of claim 1 wherein said outer and said reinforcing sheets have a plurality of concentric, fastener apertures (36) extending therethrough.

14. The laminated, truck bumper of claim 1 wherein said mechanical finish is a bright annealed finish.

15. The laminated, truck bumper of claim 14 further comprising a substantially transparent coating (37) disposed on said exterior surface of said outer sheet.

16. The laminated, truck bumper of claim 1 wherein said outer and said reinforcing sheet each have a plurality of concentric apertures (33, 34; 36; 40,41) extending therethrough.

17. The laminated, truck bumper of claim 16 wherein said outer sheet has a sheet thickness (24) of substantially no more than 0.075 inches and wherein said highly reflective finish is a mirror finish.

18. The laminated, truck bumper of claim 16 wherein said outer sheet comprises stainless steel (23) and wherein said highly reflective finish is a bright annealed finish.

19. The laminated, truck bumper of claim 16 further comprises at least one light fixture (35) disposed in selected of said plurality of concentric apertures.

20. A laminated, truck bumper (10) comprising:
    an outer sheet (11) of stainless steel (23) having a sheet thickness (24) of substantially no more than 0.075 inches and an exterior surface (14) with a mirror finish (15), said exterior surface of said outer stainless steel sheet having a layer (46) of chrome disposed thereon, said outer stainless steel sheet configured into a first elongated channel (12) having a first channel recess (13) extending longitudinally therein with closed ends (27,28);
    a reinforcing sheet (16) of a metal (39) other than said stainless steel and configured into a second elongated channel (17) having a second channel recess (18) extending longitudinally therein, said reinforcing sheet being disposed in said first channel recess and connected to said outer stainless steel sheet, an exterior surface (38) of said reinforcing sheet having an apertured indentation (19) extending into said second channel recess and being an aperture (20) extending therethrough; and a fastener (21) extending through said aperture of said indentation and into said second channel recess and having a head (22) disposed in said indentation.

* * * * *